(12) United States Patent
Lee

(10) Patent No.: US 10,857,714 B2
(45) Date of Patent: Dec. 8, 2020

(54) ACTUATOR APPARATUS AND METHOD ENABLING MULTIPLE PISTON VELOCITIES

(71) Applicant: Synventive Molding Solutions, Inc., Peabody, MA (US)

(72) Inventor: Christopher Lee, Beverly, MA (US)

(73) Assignee: Synventive Molding Solutions, Inc., Peabody, MA (US)

(*) Notice: Subject to any disclaimer, the term of this patent is extended or adjusted under 35 U.S.C. 154(b) by 329 days.

(21) Appl. No.: 15/832,965

(22) Filed: Dec. 6, 2017

(65) Prior Publication Data

US 2018/0093403 A1    Apr. 5, 2018

Related U.S. Application Data

(63) Continuation of application No. PCT/US2016/043816, filed on Jul. 25, 2016, and a continuation of application No. PCT/US2015/044429, filed on Aug. 10, 2015.

(60) Provisional application No. 62/210,086, filed on Aug. 26, 2015, provisional application No. 62/204,647, filed on Aug. 13, 2015.

(51) Int. Cl.
*B29C 45/82*     (2006.01)
*B29C 45/28*     (2006.01)
(Continued)

(52) U.S. Cl.
CPC ............ *B29C 45/82* (2013.01); *B29C 45/281* (2013.01); *F15B 15/149* (2013.01);
(Continued)

(58) Field of Classification Search
CPC ... B29C 45/76; B29C 45/766; B29C 45/7613; B29C 45/28; B29C 45/2806;
(Continued)

(56) References Cited

U.S. PATENT DOCUMENTS

| | | | | |
|---|---|---|---|---|
| 4,208,879 A | * | 6/1980 | Segawa .................. | B22D 17/32 164/314 |
| 6,419,870 B1 | * | 7/2002 | Lee ........................ | B29C 45/281 264/328.1 |

(Continued)

FOREIGN PATENT DOCUMENTS

| | | |
|---|---|---|
| EP | 2360003 A1 | 8/2011 |
| WO | 2010138306 A1 | 12/2010 |

(Continued)

OTHER PUBLICATIONS

International Preliminary Report on Patentability dated Feb. 13, 2018 in corresponding international application PCT/US2016/043816.

(Continued)

*Primary Examiner* — Matthew J Daniels
*Assistant Examiner* — Shibin Liang
(74) *Attorney, Agent, or Firm* — Polsinelli, P.C.

(57) ABSTRACT

An injection molding apparatus comprising an injection machine, a manifold, a mold, a clamp plate, an actuator interconnected to a valve pin and an external actuator controller, the actuator controller comprising a controller housing adapted to control upstream flow of drive fluid from an upstream actuator drive chamber such that the rate of travel of the drive piston is selectively adjustable to a first rate of travel or velocity over a first course of travel from a gate closed position to a predetermined position of upstream travel and such that the rate of travel of the drive piston beyond the predetermined intermediate upstream position occurs at a second rate of travel or velocity that is higher than the first rate of travel or velocity.

19 Claims, 4 Drawing Sheets

(51) Int. Cl.
*F15B 15/14* (2006.01)
*F15B 15/20* (2006.01)

(52) U.S. Cl.
CPC .. *F15B 15/204* (2013.01); *B29C 2945/76595* (2013.01); *F15B 15/1428* (2013.01); *F15B 15/1447* (2013.01)

(58) Field of Classification Search
CPC ............ B29C 2045/2848; B29C 45/82; B29C 2045/826; B29C 45/762; B29C 45/286; F15B 15/14; F15B 15/20; F15B 15/02; F15B 21/00
See application file for complete search history.

(56) References Cited

U.S. PATENT DOCUMENTS

2010/0225025 A1    9/2010   Striegel
2015/0239161 A1*   8/2015   Antunes .................. B29C 45/77
                                                                              264/40.5

FOREIGN PATENT DOCUMENTS

WO    2012074879 A1   6/2012
WO    2014134376 A1   9/2014

OTHER PUBLICATIONS

Int'l. Search Report and Written Opinion dated Oct. 26, 2016 in corresponding Int'l. Appln. PCT/US2016/043816.

\* cited by examiner

US 10,857,714 B2

ACTUATOR APPARATUS AND METHOD ENABLING MULTIPLE PISTON VELOCITIES

RELATED APPLICATIONS

This is a continuation of and claims the benefit of priority to PCT/US2016/043816 filed Jul. 25, 2016 which in turn claims priority to U.S. Provisional Application No. 62/204,647 filed Aug. 13, 2015 and U.S. Provisional Application No. 62/210,086 filed Aug. 26, 2015 and is also a continuation of and claims the benefit of priority to PCT/US2015/044429 filed Aug. 10, 2015, the disclosures of all of which are incorporated herein in their entirety as if fully set forth herein.

BACKGROUND OF THE INVENTION

Injection molding systems such as disclosed in PCT Application No. PCT/US11/062099 and PCT Application No. PCT/US11/062096 have been developed employing controls that regulate the velocity of an actuator drive at multiple selectable speeds at selectable times and over selectable lengths of valve pin travel.

SUMMARY OF THE INVENTION

In accordance with the invention there is provided an injection molding apparatus 5 comprising an injection machine 10, a manifold 16, a mold 24, 25, a clamp plate 36, an actuator 50 interconnected to a valve pin 28 and an actuator controller 200 external to the actuator, the actuator 50 comprising a housing 54 having a drive piston 56 disposed within a piston bore, the piston 56 dividing the piston bore into an upstream fluid drive chamber 75 communicating with a source S of drive fluid through an upstream drive fluid channel 72u and a downstream fluid drive chamber 77 communicating with the source S of drive fluid through a downstream drive fluid channel 72d, the actuator controller 200 comprising a controller housing 202 external to the actuator having a drive fluid receiving channel 306p that receives drive fluid 6ue exiting the upstream drive chamber 75 of the actuator 50, the controller housing 202 being adapted to control upstream flow of drive fluid from the drive chamber 75 such that the rate of travel of the drive piston 56 is selectively adjustable to a first rate of travel or velocity over the course of travel T1 of the drive piston 56 from a gate closed position GC to a predetermined position of upstream travel UP and such that the rate of travel of the drive piston 56 over the course of travel T2 of the drive piston 56 beyond the predetermined intermediate upstream position UP is a second rate of travel or velocity that is higher than the first rate of travel or velocity.

The controller can include a travel length adjuster 310, 312 that is actuatable by a user to selectively adjust the length of travel T1 of the drive piston from the gate closed position GC to the predetermined position of upstream travel UP.

The controller can include a velocity adjuster 350 that is actuatable by a user to selectively adjust the rate of travel or velocity of the drive 56 over the course of travel T1 of the drive piston 56 from the gate closed position GC to the predetermined position of upstream travel UP The controller housing 202 is preferably adapted to route drive fluid received from the upstream drive chamber 75 at a first rate of flow to the source S over the course of travel T1 of the drive piston 56 from a gate closed position GC to a predetermined position of upstream travel UP and further adapted to route the drive fluid at a second higher rate of flow to the source S over the course of travel T2 of the drive piston 56 beyond the predetermined position of upstream travel UP of the drive piston 56.

The controller housing 202 can include a controller piston 300 reciprocally drivable in a forward 300f and a backward 300r direction A through a controller piston bore 302, the controller housing 202 and the piston 300 being adapted to route drive fluid that exits 6ue the upstream drive chamber 75 of the actuator 50 to exert a drive fluid force that drives the piston 300 upstream through a predetermined path of upstream controller travel FP1 through the controller piston bore 302 such that drive fluid is routed through the housing 202 to the source S at a first rate of flow, the housing 202 being further adapted to route drive fluid to the source S at a second rate of flow that is higher than the first rate of flow after the piston 300 has traveled through the predetermined path of controller travel FP1.

The controller piston bore 302 is typically divided by the piston 300 into a downstream controller chamber 304 that receives the exiting drive fluid 6ue and an upstream controller chamber 306 that routes drive fluid to the source S via a restriction channel 306c that has a metering valve 350 that is controllably adjustable to enable a user to selectively vary the first rate of flow.

The metering valve is typically disposed in a first fluid path 306c to the source S and the housing 202 includes a second fluid path DC through which drive fluid flows at the second rate of flow to the source S.

The controller housing 202 preferably includes a diversion channel DC that interconnects to the downstream controller chamber 304 when the piston 300 has traveled through the predetermined path of controller travel FP1, the diversion channel being adapted to enable flow of the drive fluid to the source S at the second rate of flow.

The controller housing 202 preferably includes a first drive fluid channel route 306c that routes drive fluid at a first low rate of flow to the source S and a second channel route DC that routes drive fluid to the source S at a second rate of flow that is higher than the first rate of flow.

The controller housing 202 is preferably adapted to route drive fluid downstream to the upstream drive chamber 75 such that the drive piston 56 travels at a single velocity over the course of downstream travel from an upstream-most position FUP to a gate closed position GC.

The controller 200 can include a spring 300s adapted to constantly urge the controller piston 300 in a downstream direction toward an injection cycle start position LP, the spring 300s exerting a spring force SF on the controller piston 300 that is substantially less than the drive fluid force of the drive fluid 6ue exiting the actuator drive chamber 75 such that the drive fluid 6ue exiting the actuator drive chamber 75 readily drives the piston 300 upstream 300f.

In another aspect of the invention there is provided a method of driving an actuator piston 56 upstream from a gate closed GC position at multiple upstream velocities comprising driving an actuator 50 contained in an apparatus as described immediately above upstream over the course of an injection cycle.

In another aspect of the invention there is provided an injection molding apparatus 5 comprising an injection machine 10, a manifold 16, a mold 24, 25, a clamp plate 36, an actuator 50 interconnected to a valve pin 28 and an actuator controller 200, the actuator 50 comprising a housing 54 having a drive piston 56 disposed within a piston bore, the piston 56 dividing the piston bore into an upstream fluid drive chamber 75 communicating with a source S of drive fluid through an upstream drive fluid channel 72u and a downstream fluid drive chamber 77 communicating with the source S of drive fluid through a downstream drive fluid channel 72d, the actuator controller 200 comprising a controller housing 202 containing a controller piston 300 reciprocally drivable in a forward 300f and a backward 300r direction A through a controller piston bore 302 divided into a downstream controller chamber 304 and an upstream controller chamber 306, the controller housing 202 including a first drive fluid port 204 that routes drive fluid between the upstream fluid drive chamber 75 of the actuator 50 and the downstream controller chamber 304 of the actuator controller 200 and a second drive fluid port 206 interconnected to the source S of drive fluid that receives drive fluid from the upstream controller chamber 306 of the controller 200, the controller housing 202 being adapted to route drive fluid that exits 6ue the upstream drive chamber 75 of the actuator 50 to drive the piston 300 under a drive fluid force through a path of travel FP1 during which drive fluid is routed through the housing 202 to the second drive fluid port 206 at a first rate of flow, the controller housing 202 being further adapted to route drive fluid through the housing 202 to the second drive fluid port 206 at a second rate of flow that is higher than the first rate of flow after the piston 300 has traveled through the path of travel FP1.

In such an apparatus, the controller housing 202 is preferably adapted to enable the rate of travel of the drive piston 56 to be selectively adjustable to a first rate of travel or velocity over the course of travel T1 of the drive piston 56 from a gate closed position GC to a predetermined position of upstream travel UP and to adjust the rate of travel of the drive piston 56 over the course of travel T2 of the drive piston 56 beyond the predetermined intermediate upstream position UP to a second rate of travel or velocity that is higher than the first rate of travel or velocity.

The controller 300 preferably includes a travel length adjuster that is actuatable by a user to selectively adjust the length of travel T1 of the drive piston from the gate closed position GC to the predetermined position of upstream travel UP.

The controller 200 preferably includes a velocity adjuster that is actuatable by a user to selectively adjust the rate of travel or velocity of the drive piston 56 over a course of travel T1 of the drive piston 56 from the gate closed position GC to a predetermined position of upstream travel UP The controller housing 202 is preferably adapted to route drive fluid received from the upstream drive chamber 75 at the first rate of flow to the source S over the course of travel T1 of the drive piston 56 from a gate closed position GC to a predetermined position of upstream travel UP and further adapted to route the drive fluid at a second higher rate of flow to the source S over the course of travel T2 of the drive piston 56 beyond the predetermined position of upstream travel UP of the drive piston 56.

The controller piston bore 302 is typically divided by the piston 300 into a downstream controller chamber 304 that receives the exiting drive fluid 6ue and an upstream controller chamber 306 that routes drive fluid to the source S via a restriction channel 306c that has a metering valve 350 that controllably restricts flow of the drive fluid to the first rate of flow.

The velocity adjuster is preferably controllably adjustable to restrict flow of the drive fluid to a selectable rate of restricted flow.

The controller housing 200 can includes a diversion channel DC that interconnects to the downstream controller chamber 304 when the piston 300 has traveled through the predetermined path of controller travel FP1, the diversion channel being adapted to enable flow of the drive fluid to the source S at the second rate of flow that is higher than the first rate of flow.

The controller housing 202 preferably includes a first drive fluid channel route 306c that routes drive fluid at a first low rate of flow to the source S and a second channel route DC that routes drive fluid at a second higher rate of flow to the source S.

The controller housing 202 is preferably adapted to route drive fluid downstream to the upstream drive chamber 75 such that the drive piston 56 travels at a single velocity over the course of downstream travel from an upstream-most position FUP to a gate closed position GC.

The controller 200 can include a spring 300s adapted to constantly urge the controller piston 300 in a downstream direction toward an injection cycle start position LP, the spring 300s exerting a spring force SF on the controller piston 300 that is substantially less than the drive fluid force of the drive fluid 6ue exiting the actuator drive chamber 75 such that the drive fluid 6ue exiting the actuator drive chamber 75 readily drives the piston 300 upstream 300f.

In another aspect of the invention there is provided a method of driving an actuator piston 56 upstream from a gate closed GC position at multiple upstream velocities comprising driving an actuator 50 contained in an apparatus described immediately above upstream over the course of an injection cycle.

BRIEF DESCRIPTION OF THE DRAWINGS

The above and further advantages of the invention may be better understood by referring to the following description in conjunction with the accompanying drawings in which.

DETAILED DESCRIPTION

Figure 1:
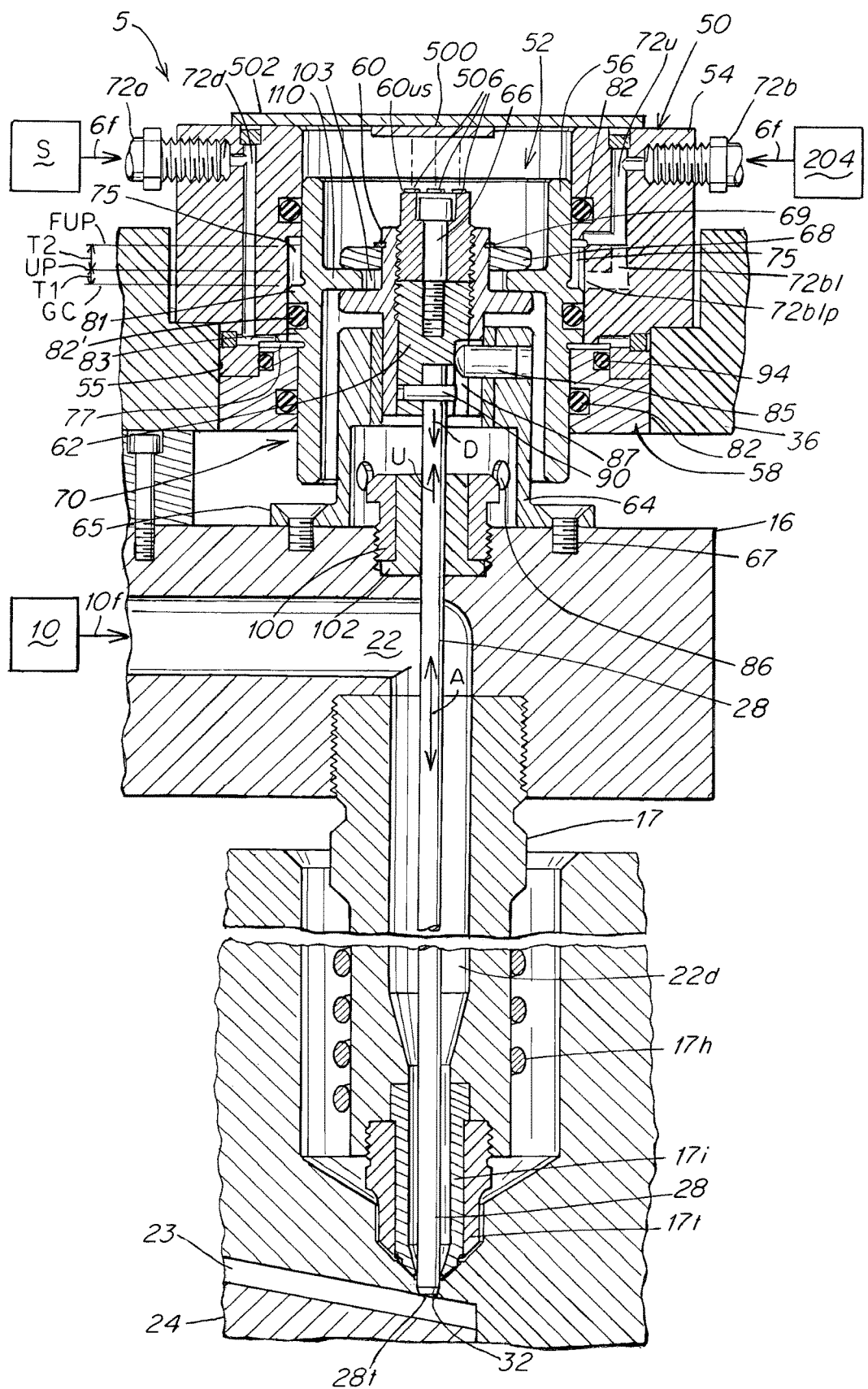
FIG. 1 is a cross sectional view of the actuator, clamp plate, manifold and nozzle components of an apparatus according to the invention showing the upstream fluid drive chamber of the actuator communicating with a port of an external drive fluid flow controller.

FIG. 1 shows one embodiment of an apparatus 5 according to the invention, where the apparatus 5 includes an actuator 50 that includes a magnetic field sensor 500 mounted on the downstream facing side of a mounting plate 502 which is readily attachable to and detachable from an upstream portion 54 of the actuator cylinder or housing 54 via conventional means such as screws 504 which screw into the body of housing 54. As shown in FIG. 1 one or more magnets 506 are mounted on the upstream facing portion or surface of the piston assembly which includes the piston 56

(together with associated actuator cap 60, pin head or adjustment screw 62, actuator support 64, and locking screw 66). More particularly in the embodiment shown, the magnets 506 are mounted in or on the upstream facing surface 60*us* of the actuator cap 60 component of the assembly 56 et al. that enables the axial position of the valve pin 28 to be adjusted relative to the piston (or pin "drive member") along the axial upstream-downstream direction or axis A.

As shown in FIG. 1, the injection molding apparatus 5 comprises a manifold 16 that receives an injection fluid material 10*f* from an injection molding machine 10, the manifold 16 routing the injection fluid 10*f* to a fluid delivery channel 22 that communicates with a downstream channel 22*d* of a nozzle 17 that extends and delivers the injection fluid material 10*f* under an injection pressure to a gate 32 of a cavity 23 of a mold 24. The actuator 50 comprises a housing 54 having a drive member or piston 56 slidably mounted within the housing 54 for controllably driven movement along a controllably drivable upstream and downstream path of travel A within the housing 54, the drive member 56 being mounted to the apparatus 10 and interconnected to the valve pin 28 in an arrangement wherein the valve pin 28 is controllably drivable in the axial upstream-downstream direction A through the flow path 22 of the manifold and with flow path 22*d* of the nozzle 17 between gate open and gate closed positions.

As shown in FIGS. 1-4 the upstream drive chamber 75 of the actuator 50 is interconnected to and communicates via actuator output channel 72*u* and upstream actuator port 72*b* with the input and output port 204 of an external flow controller 200. The actuator port 72*b* is readily interconnectable to and detachable from the port 204 of the external controller 200 via suitable high pressure resistant tubing that is capable of communicating and routing hydraulic or pneumatic fluid between the ports 72*b* and 204. The flow controller 200 comprises a housing or housing body 202 that contain fluid flow channels DC, 306*c*, 306*p*, 306*r* bored into the housing body 202 for controlling routing of drive fluid at different rates of flow depending on the direction in which the drive fluid is driven into or out of ports 204 and 206.

Figure 2:
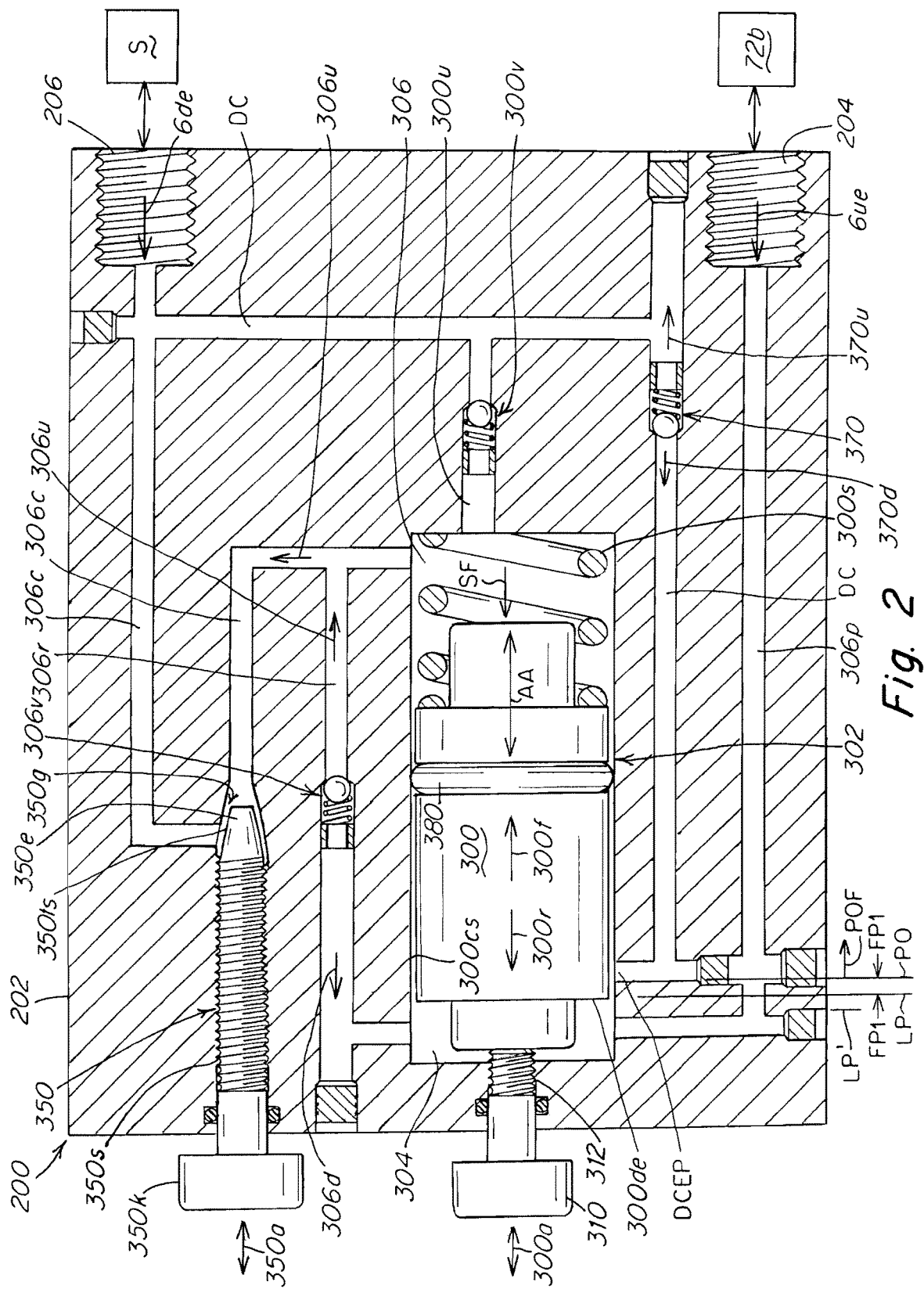
FIG. 2 is a side schematic sectional view of one embodiment of an external drive fluid controller for use in an apparatus according to the invention, the controller having a piston having a fluid seal O-ring and a spring loaded within one of the chambers of the piston bore.

In an apparatus 5 that uses a controller 200 as shown in FIG. 2, at the start of operation, the actuator piston 56 is disposed in a gate closed GC fully downstream position as shown in FIG. 1. Drive fluid pressure is applied by suitable pump or other mechanism into downstream drive chamber 77 via downstream actuator port 72*a* which causes the piston 56 to be driven upstream which in turn forces drive fluid 6*f* contained in the upstream drive chamber 75 to be driven upstream through port 72*u* and into port 204. Also at the start of the injection cycle, the piston 300 that is mounted in the bore 302 is disposed in a predetermined variably selectable left-most or downstream-most position LP as shown in FIG. 2. The piston is held in starting position at the start of the cycle when the pressure in chambers 304, 306 is about equal, by the spring force of spring 300*s* which urges the position into the downstream-most position LP. The starting position LP is adjustable and selectively variable by the user such that the length of the travel path FP1 is in turn adjustable and selectively variable, such that the low velocity upstream travel path FP1 of the piston 56 is adjustable and selectively variable. As shown for illustration, the starting position of the downstream end 300*de* of the piston 300 at the start of an injection cycle could be alternatively selected as being position LP' which would in turn lengthen or extend the length of the low velocity upstream path of travel T1 of the piston 56.

Piston 300 and the bore 302 in which piston 300 is mounted are configured such that the exterior circumferential surface 300*cs* of piston 300 is complementary to the internal surface of bore 302 such that a fluid seal is formed between the two surfaces that is excellent, but not perfect as would be formed with an O-ring. The seal between surface 300*cs* and the internal surface of bore 302 is good enough that fluid does not flow to any substantial degree between the two surfaces. The diameter size, axial length, shape and configuration of the piston 300 is configured together with the strength of the spring 300*s* such that at the start of an injection cycle when the pressure in both chambers 304 and 306 is about the same, the downstream end 300 *de* of piston 300 is positioned such that it obstructs flow of fluid 6*ue* from chamber 304 to or through the entry port DCEP of diversion channel. DC. The precise positioning of the downstream end 300*de* of piston at its injection cycle starting downstreammost position LP is adjustably positionable via knob 310 and screw 312. Such an adjustability in the starting position LP (LP') of the downstream end 300*e* enables the travel distance FP1 between the downstream-most edge 300*de* and the downstream edge of the diversion channel port DCEP to be adjusted which in turn adjusts the length of the low velocity path of travel T1 of the actuator drive piston 56 from gate closed GC to an intermediate upstream position UP over which the piston 56 travels at a reduced velocity. Such adjustment of knob 310 and screw 312 similarly enables the user to adjust the length of the path of travel T2 of the piston 56 from the intermediate upstream position UP to the upstream position FUP over which the piston 56 travels at a higher velocity.

Figure 3:
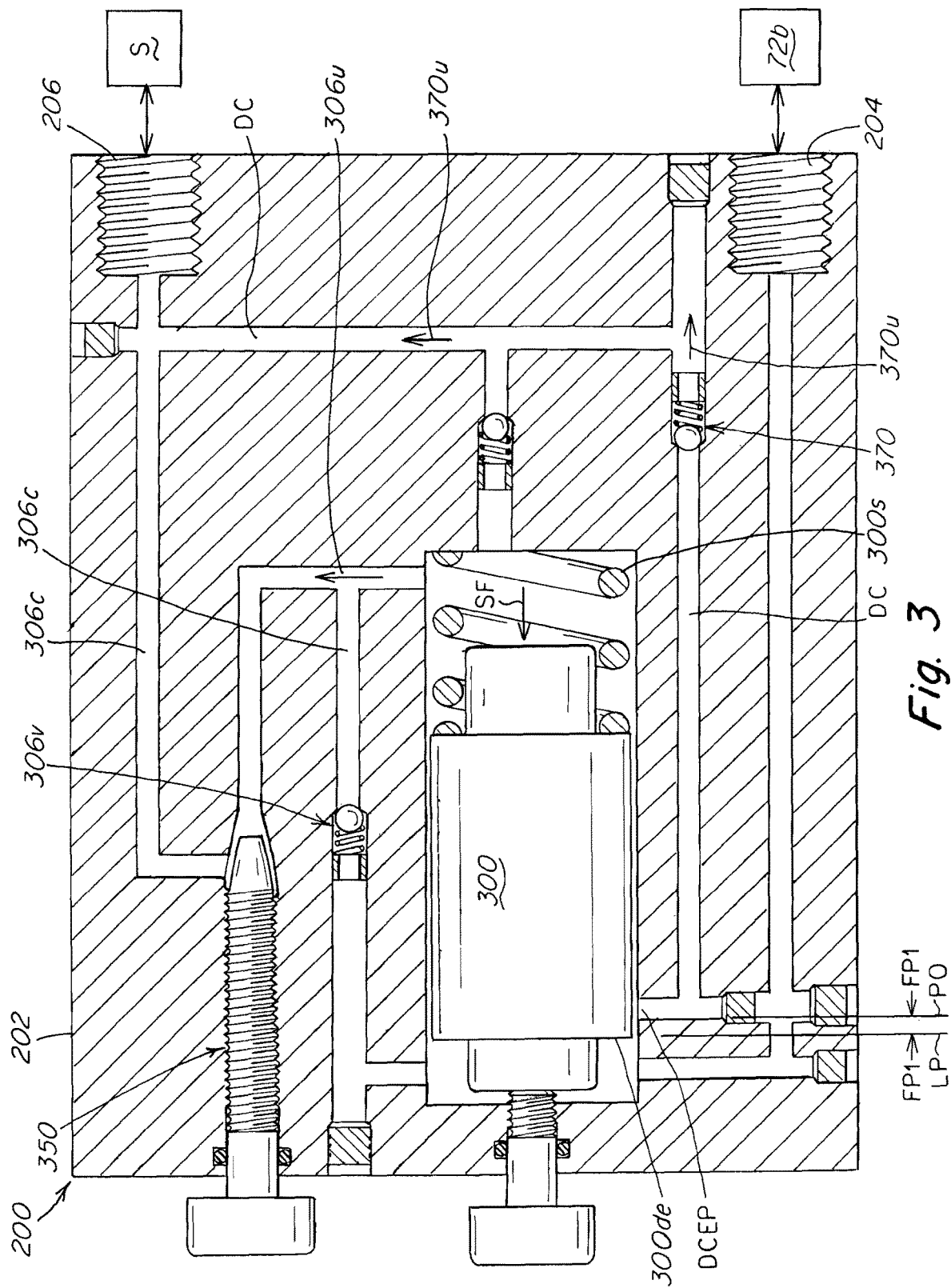
FIG. 3 is a side schematic sectional view of another embodiment of an external drive fluid controller similar to the FIG. 2 controller without an O-ring.
Figure 4:
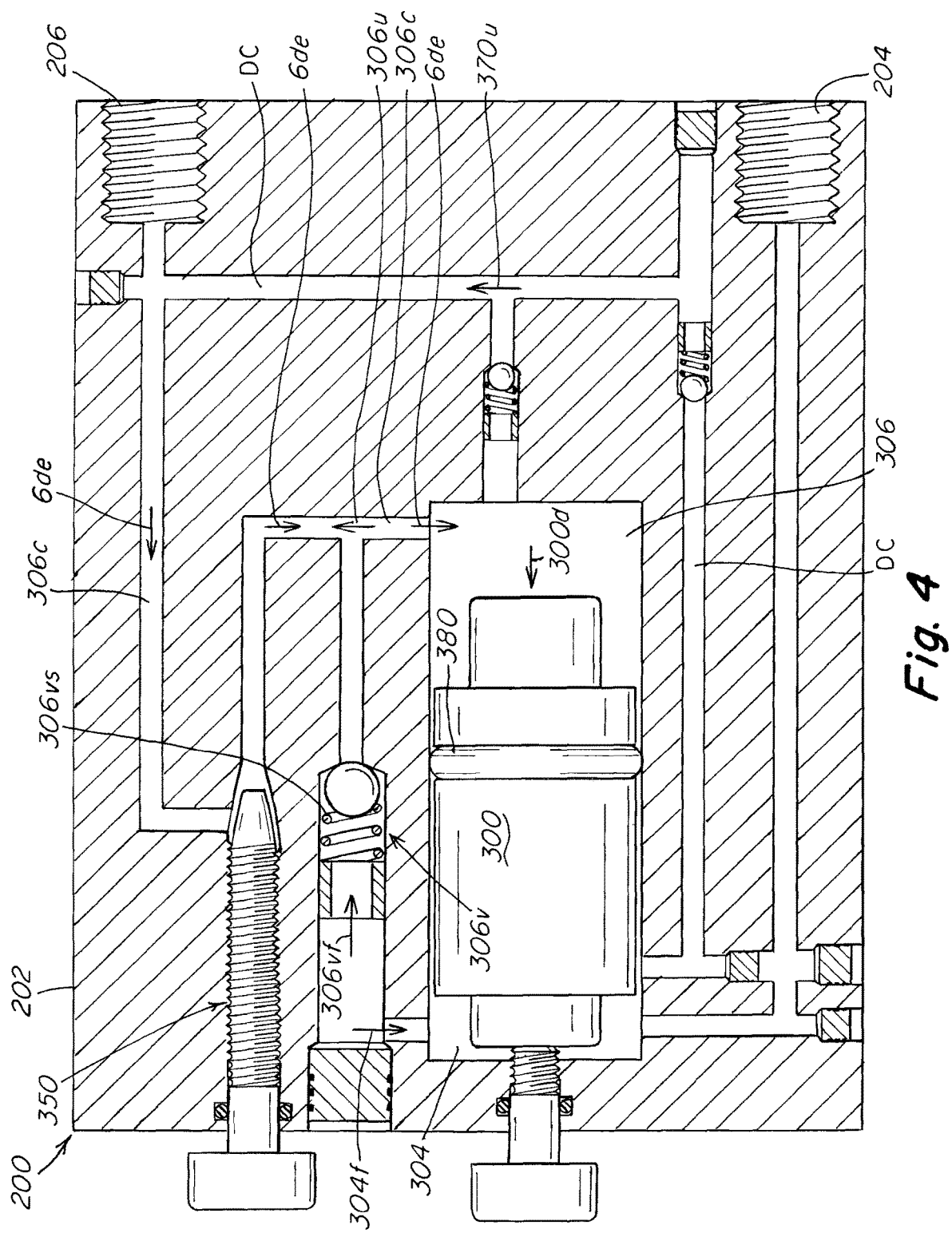
FIG. 4 is a side schematic sectional view of another embodiment of an external drive fluid controller similar to the FIGS. 2 and 3 controller without a spring loaded within the chambers of the piston bore.

An injection cycle is started by injecting drive fluid 6*f* under pressure into actuator chamber 77 which drives the piston 56 upstream forcing drive fluid 6*f* under pressure out of port 72*b* and into port 204 of the controller 200. The drive fluid thus exiting port 72*b* enters port 204 under pressure and is routed via controller channel 306*p* into controller chamber 304 which drives controller piston 300 in the upstream 300*f* direction. As shown in FIGS. 2-4, drive fluid 6*ue* is prevented from travelling from channel 306*p* to channel C by plug or stop 320, the drive fluid instead being routed to chamber 304 at the start of an injection cycle.

As fluid 6*ue* continues to drive piston 300 in the upstream 300*f* direction, drive fluid that resides in chamber 306 is driven upstream through channel 306*c* to and through the restriction gap 350*g* that is formed in the channel 306*c* between the interior surface 306*cs* of the channel 306*c* and the exterior surface 350*ts* of the distal end 350*e* of the metering valve 350. The configuration of the distal end 350*e* of the metering pin or valve 350 and the configuration of the interior surface 306*cs* are adapted and configured so as to create a restriction gap 350*g* that restricts the rate of flow of drive fluid relative to the high or normal rate of flow through the channel DC that does not have any such restriction as is created by metering valve or pin 350 within channel 306. The metering valve or pin 350 is selectively adjustable in a back and forth direction 300*a* via knob 350*k* and screw 350*s* such that the size of the gap 350*g* is selectively adjustable or variable. Depending on the magnitude or degree of the selected size of the restriction gap 350*g*, the rate of restricted flow of drive fluid from chamber 306 through channel 306*c* and eventually out of upstream port 206 to the source S can be selectively varied by the user. Concomitantly, the rate of reduced velocity at which the drive piston 56 travels T1 from the gate closed position GC to the intermediate upstream position UP over the course of an injection cycle can be selectively varied by selective adjustment of the size of the restriction gap 350g via knob 350k.

As the controller piston 300 is driven continuously upstream 300f, the downstream end 300de eventually reaches the downstream edge PO of the port DCEP and travels further POF upstream 300f such that port DCEP is open enough to allow pressurized fluid 6ue resident in chamber 304 to flow upstream 370u under high or full applied pressure at high velocity without restriction through channel DC and also through check valve 370 which in turn results in drive fluid being routed fully upstream from chamber 304 through channel DC and ultimately through port 206 to source S under full applied pressure at high velocity. When the downstream end 300e reaches the downstream edge PO of the port DCEP, the actuator piston 56 has traveled upstream to the intermediate upstream position UP. On continued input of fluid 6ue into port 204, the controller piston 300 continues to travel POF upstream 300f such that the port DCEP is opened sufficiently to enable fluid exiting 6ue the actuator chamber 75 to flow through channel DC at a relatively high velocity relative to the velocity of travel of the fluid through channel 306c. The relatively high rate of travel of drive fluid 6ue through channel DC and eventually through port 206 thus enables the actuator piston 56 to travel at a higher upstream velocity along path T2 from the intermediate upstream position UP to the further or fully upstream position FUP. Thus the controller 200 mechanically controls and limits the rate of upstream travel or velocity of the actuator piston 56 and its interconnected valve pin 28 to two separate velocities during the course of the upstream movement of an injection cycle. The first velocity being a relatively low velocity during upstream travel from the gate closed GC position to the intermediate upstream UP position and a relatively high velocity during upstream travel from the intermediate upstream position UP to the further or fully upstream position FUP.

The controller 200 also enables the user to selectively vary the lengths T1 and T2 over which the actuator piston 56 is driven upstream at reduced and higher velocities by way of the user's selectively adjusting the precise cycle starting position LP (LP') of the downstream end 300de of piston 300 relative to the downstream edge of diversion port DCEP. Selection of the precise position LP (LP') is carried out at the beginning of an injection cycle by selectively adjusting or turning knob 310 which is mounted in screw 312 which selectively moves the end 300de of the piston upstream 300f or downstream 300r depending on the degree of turning knob 310 clockwise or counterclockwise. LP' is shown as an example of alternative multiple different starting positions relative to position LP and not just a single alternative starting position.

As shown in FIGS. 1-4, one way check valves 370, 306v, 300v are provided within channels DC, 306 and 300u respectively to prevent fluid flow in one direction and enable fluid flow in the opposite direction when the pressure of the fluid exceeds the spring force of the valve. For example, check valve 370 allows fluid flow in the upstream 370u direction when the upstream fluid pressure exceeds the spring force of the valve 370 and prevents fluid flow in the downstream direction 370d. Similarly valve 306v allows fluid flow in the downstream direction 306d into and through chamber 304 and channel 306p when the downstream fluid pressure exceeds the spring pressure of the valve 306v, and valve 306v prevents fluid flow in the upstream direction 306u through channel 306c. Similarly, valve 300v prevents fluid flow through channel 300u in the upstream direction 300f and allows fluid flow in the downstream direction 300r when the downstream fluid pressure exceeds the spring force of the valve 300v.

In reverse operation, when drive fluid is pumped in the downstream direction 6de from the source, the drive fluid 6de flows at high velocity during the entire downstream portion of the injection drive cycle to act to drive the actuator piston 56 at high velocity all the way from the full upstream position FUP downstream to the gate closed position GC. Flow of the downstream pressurized fluid 6de occurs essentially unrestricted by way of flow from port 206 through channel DC through check valve 300v through channel 300u through chamber 306 through channel 306r through check valve 306v through chamber 304 through channel 306p through port 204 and into actuator chamber 75 which drives actuator piston 56 downstream. Flow of fluid 6de also occurs at a restricted rate of flow downstream through channel 306c but the restricted flow is supplemental to the unrestricted flow through channel DC and downstream therefrom as described.

In the embodiment shown in FIG. 1, an O-ring 380 is provided which provides a perfect fluid seal between the outside surface of the O-ring 380 and the inside surface of the piston bore 302 such that fluid does not flow at all between chambers 304 and 306. The O-ring 380 creates a small amount of drag on the movement 300r, 300f of the piston 300 along axis AA when the piston is driven but not enough to significantly affect the velocity of flow of drive fluid back and forth through the system. In the FIG. 2 embodiment, an O-ring is not provided which can enable some small insignificant amount fluid to flow between chambers 304, 306.

In the FIGS. 1, 2 embodiments, piston spring 300s is provided to provide a spring force along the piston axis AA and ensure that the piston 300 will return to its starting position LP at the end of an injection cycle when the drive fluid in the system is not being proactively pumped in either the upstream or downstream directions and the pressure in chambers 304 and 306 is essentially the same. The spring 300s is adapted such that it when it is mounted in the bore together with the piston 300, the spring 300s maintains a constant selected amount of spring force SF against the piston 300 pushing the piston along axis AA in the downstream direction 300r toward the selected starting position LP. The amount of spring force SF is small relative to the force exerted by the upstream applied pressure of the drive fluid 6ue in chamber 304 during the upstream drive portion of the injection cycle such that the drive fluid 6ue can readily drive the piston 300 in the upstream direction 300f against force SF during the upstream drive portion of an injection cycle. Similarly, the spring forces of the springs used in check valves 370, 300v, 306v are small relative to the amount of pressure exerted in the directions against the springs such that drive fluid can readily flow in the appropriate direction through the check valves. In each case, the springs 300s and the springs associated with the check valves are always compressed so as to exert a force on either the piston 300 or the balls of the respective check valves.

In the FIG. 3 embodiment, an O-ring 380 is not provided around the piston 300. In such an embodiment, the fluid seal between the outside surface of the piston 300cs and the inside surface of the bore 302 is excellent although not perfect such that leakage of pressurized fluid between chamber 304 and 306 when pressurized fluid is applied does not substantially affect movement of the piston 300 to carry out the functions described where the housing and the piston effect a first slow fluid flow velocity over the travel path FP1 of piston 300 and a higher fluid flow velocity after the end 300*de* of the piston 300 has traveled past the diversion channel port DCEP.

In the FIG. 4 embodiment, a spring such as spring 300*s* is not provided for engagement with the piston 300. Instead, the one way check valve 306*v* is provided with a spring 306*vs* that has a larger or large enough spring force 306*vf* that requires the pressure of the downstream pressurized return fluid 6*de* to exert such higher pressure within controller piston chamber 306 which is higher than the pressure of fluid 304*f* that pressurizes chamber 304 thus resulting in piston 300 being driven downstream 300*d* on exertion of downstream pressurized fluid 6*de* on during the downstream portion of the injection cycle. Such downstream force from fluid 6*de* and movement 300*d* thus returns the piston even without spring 300*s* to the injection cycle start position LP (LP') when the upstream drive portion of the cycle is performed subsequent to completion of the downstream drive portion.

The housing 54 of the actuator 50 is mounted in a stationary position in the axial upstream-downstream direction A relative to the gate 32. In the embodiment shown, one or more magnets 506 that generate a magnetic or electromagnetic field are mounted to the piston or drive member 56 such that the one or more magnets 506 move in the axial upstream-downstream direction A together with movement of the drive member 56 in the axial upstream-downstream direction A. A magnetic or electromagnetic field sensor 500 is attached to the mount 502, the mount 502 being readily fixedly interconnectable via bolts 504 or other conventional means to the actuator housing 54 such that the sensor 500 is mounted in a stationary position in the axial upstream-downstream direction A relative to the gate 32. The mount 502 is readily detachable from the actuator housing 54 via unscrewing of the bolts 504 which are manually accessible to a user from an upstream position without having to disassemble any part or portion of the fully assembled injection molding apparatus 10.

The sensor 500 is attached to and arranged on the mount 502 and the mount 502 is fixedly connected to the housing 54 in arrangement where the sensor 500 senses a strength or nature of the magnetic or electromagnetic field generated by the magnets 506, the strength or nature of the magnetic or electromagnetic field sensed by the sensor 500 varying in relation to the axial position of the one or magnets along the axial upstream-downstream direction A relative to the sensor 500. The sensor 500 is interconnected to and sends a signal indicative of the sensed strength or nature of the magnetic or electromagnetic field to a controller 16, FIG. 2. The controller 16 receives, uses and converts the signal sent by the sensor 500 as or to position information for use in a program having instructions that control a fluid drive system 600 to drive the drive member 56 to one or more selected positions at one or more preselected times or at one or more selected velocities for one or more preselected times during the course of an injection cycle.

The drive member 56 preferably includes a pin adjustment member 60 that is readily manually accessible to a user and is readily adjustable in conjunction with other components (62, 66, 68, 56) to selectively position the pin at any one of a plurality of fixed axial positions relative to the drive member 56 in the axial upstream-downstream direction A, the one or more magnets 506 being mounted to the upstream facing surface 60*us* of the pin adjustment member 60.

The sensor 500 preferably comprises a Hall Effect sensor. The magnets 506 and the sensor 500 are mounted to the housing 54 and member 60 in spatial positions that are selected so that the sensor 500 can sense and detect the strength and quality of the magnetic field generated by the magnets 506 at all axial A positions along the entire length of the upstream-downstream path of travel (stroke length L, FIG. 4) of the piston or drive member 56. The Hall Effect sensor 500 can detect the strength, degree, nature or quality of the magnetic field generated by the magnets 506. The strength, degree, nature or quality of the magnetic field generated the magnetic 506 that is detected by the sensor 500 varies depending on the precise spatial positioning between the magnets 506 relative to the sensor 500. Therefore when the piston 56 spatially moves in position relative to the stationary mounting plate 502 and attached stationary sensor 500, the sensor 500 detects a magnetic field having a strength, degree, nature or quality that is peculiar to the precise axial position A of the magnets 506 and interconnected valve pin 28 relative to the sensor 500. Such variation in the detected strength, degree, nature or quality of the magnetic field generated by the magnet 506 can thus be correlated or calibrated to correspond to the spatial positions of the valve pin 28 and stationary housing 54 relative to each other. Thus, the Hall Effect sensor 500 can used as a wireless sensor of and for the relative positions of the valve pin 28 and any other stationary component such as the gate 32, or housing 56, and fortiori, can be used to detect the position of the tip end 30 of the valve pin 28 relative to the gate 32 during the course of an injection cycle. The controller 16 can include multiple different protocols for controlling the position of the pin based on real-time detection of the valve pin position using the sensor 500 and magnets 506 according to position control protocols as described in detail in PCT Application No. PCT/US11/062099 and PCT Application No. PCT/US11/062096 and U.S. Pat. No. 6,361,300 (7006), 6,419,870 and 6,464,909 (7031), the disclosures of all of which are incorporated herein by reference in their entirety as if fully set forth herein.

The sensor 500 operates together with the magnets 506 in a manner similar to the Hall Effect sensor and magnets described in PCT Application serial no. PCT/US2012/067379, the disclosure of which is incorporated herein by reference in its entirety as if fully set forth herein.

With reference to the specific actuator embodiment of a quickly assemblable and dissemblable actuator as shown in FIG. 1, the actuator and sensor are assembled together with a mold part 24, typically called a core block, and a mold part 25, typically called a cavity block. Disposed upstream of the upper mold part 25 is the hot runner manifold 16. The hot runner manifold 16 supports nozzle 17, which is threadably screwed therein. About each nozzle 17 there is provided a heater 17*h*, for maintaining the melt material 10*f* passing through the nozzle 17 at its process temperature. Heat pipes (not shown) may be employed in the nozzle 17, alone, or in conjunction with band heaters 17*d* such as illustrated in U.S. Pat. No. 4,389,002.

Formed between mold parts 24, 25 is a cavity 22 that determines the contour of the molded part being produced. At the end of the nozzle 17, there is provided a nozzle tip 17*t*, disposed about a nozzle insert 17*i*.

FIG. 1 illustrates the valve pin 28 in its gate closed position. The valve pin 28 extends through the central flow bore 22*d* in the nozzle 17, and can have a tapered tip 28*t* end 30 that mates with a complementary shaped tapered gate 32 in the mold. It should be noted that the invention is not limited to a particular type of nozzle arrangement, as different tip and insert configurations are possible. For example, the gate could be formed in the tip, with the valve pin mating with the tapered surface of the tip. Furthermore, as shown in FIG. 1, when gating directly onto an angled part surface, the valve pin 28 can be contoured to match the part.

Associated with the valve pin 28 is the actuator assembly 52 that includes a cylinder 54 which is mounted in an accommodating aperture 55 in the clamping plate 36. In the embodiment shown, the receiving aperture 55 in the clamp plate 36 is of a stepped configuration. The actuator assembly also includes a piston 56 supported within the cylinder 54 and held in place by a retainer 58.

The valve pin assembly 70, FIGS. 8, 9 includes an actuator cap 60, pin head 62, actuator support 64, and locking screw 66. Ring 68 and associated snap ring 69 facilitate interconnection between the valve pin assembly 70 and the piston 56. The valve actuator cylinder 54 has two hydraulic lines 72 that connect thereto. These hydraulic lines provide pressurized fluid between the piston 56 and the cylinder 54 to facilitate movement of the piston within the complementary bore contained within the cylinder 54. With reference to FIGS. 4 and 5 it is noted that the hydraulic lines 72 are schematically shown on opposite sides of the cylinder 54 for the sake of schematic explanation to more clearly describe the operation of the hydraulic circuit as it relates to operation of the actuator assembly 52 and valve pin assembly 70.

To drive the piston in the upstream direction U such that drive fluid 6f flows upstream to exit through the cylinder port 72u and further through port 72b, drive fluid 5f is first driven under pressure into downstream drive chamber port 72a.

Conversely to drive the piston 56 downstream D, such that drive fluid 6f flows downstream to exit through the cylinder port 72d and further through port 72a, drive fluid 6f is first driven under pressure into downstream drive chamber 75 through port 72b.

Thus when the hydraulic line 72a is pressurized, the valve pin 28 and piston 56 moves upstream to the up position with hydraulic pressure being exerted through channel 72d and fluid drive chamber 77 against annular flange 83 of piston 56 to move the piston 56 in an upstream direction. Conversely when hydraulic port 72b is pressurized, the valve pin 28 and piston 56 moves downstream to the gate closed position with hydraulic pressure being exerted through the port 72u into upstream drive chamber 75 against annular flange 81 of piston 56 to move the piston 56 downstream.

As shown by dashed lines in FIG. 1, an end of stroke bleed channel 72b1 can be additionally provided such that when the piston 56 has been driven to its upstream-most position, the moving piston O-Ring 82' that separates chambers 75 and 77 travels to an upstream-most position just past the port 72b1 such that drive fluid contained within downstream drive chamber 77 can leak or bleed through port 72b1 only at the end of the fully upstream travel FUP of the piston 56 when the O-ring 82' has traveled past the port entrance 72blp to bleed port 72b1. Such leakage from chamber 77 through port 72blp occurs as a result of leakage through a gap between the outside circumferential edge of piston flange member 83 and the inside surface of the cylinder 54 bore within which piston 56 is mounted. Such a bleed mechanism 72b1 is an alternative mechanism that can be included or not included.

Cylinder 54 is positioned in a recess or aperture 55 that is machined in the top clamp plate 36 and is held in position by four mounting screws. The top of the cylinder 54 is typically provided with two lift holds that enable the cylinder to be easily removed from the top clamp plate, when the screws and a ring 69 are removed. The hydraulic lines 72a, 72b are located within machined channels in the top clamp plate 36. These channels are typically terminated on one side of the top clamp plate (nonoperator side) using quick disconnect fittings.

The cylinder 54 is in thermal contact with the top clamp plate as. The temperature of the manifold 16 is controlled to be at the plastic processing temperature (450.degree. F.-550.degree. F. typically). The top clamp plate is typically provided with water cooling lines machined through the top clamp plate. With regard to the description hereinbefore, reference has been made to hydraulic lines 72. However, the same principles also apply to the use of pneumatics. Typically, higher pressures are used in hydraulics such as 300-1500 psi. Pneumatics are limited to plant supplied air pressure which is typically 85-100 psi. Accordingly, a pneumatic actuator tends to be larger with increased piston area needed to generate forces equivalent to a hydraulic actuator.

Movement of the valve pin 28 is caused by the piston 56 moving vertically within the valve cylinder 54 when pressurized. As indicated previously, there are three O-rings 82 that are provided. These O-rings can be comprised of Viton. The O-rings 82 provide hydraulic fluid seals between the piston 56 and the cylinder 54, as well as between the piston 56 and the retainer 58. Furthermore, other seals such as cup seals may be used.

The retainer 58 is used to support the piston 56 within the cylinder 54. The retainer 58 also limits the travel of the piston in the downward direction. The retainer 58 is provided with a series of through holes and counter bores to receive retaining screws. One of the larger O-rings 82 can be disposed between the retainer 58 and the piston 56. This provides a hydraulic seal with the piston. A second smaller O-ring 94 is used to provide a hydraulic seal between the retainer 58 and the cylinder 54.

The valve pin assembly 70 secures the valve pin 28 to the actuator and includes actuator cap 60, actuator support 64, pin head 62, and locking screw 66. The valve pin assembly 70 is secured to the piston 56 primarily by means of the ring 68 and the associated snap ring 69, as illustrated in FIG. 8. The ring 68 and the snap ring 69 provide a clamping action to secure the valve pin assembly 70 to the piston 56. The actuator cap 60 has a counter bore and a through hole to receive the locking screw 66. The actuator cap 60 is also internally threaded, such as illustrated in FIGS. 4-6, to receive the externally threaded pin head 62.

The actuator support 64 has a base flange 65 that is used to mount the actuator support directly to the hot runner manifold 16. For providing this mounting, there are provided mounting screws 67. The actuator support 64 is preferably constructed of a material of low thermal conductivity such as titanium or stainless steel to increase the thermal gradient between the manifold 16 and the actuator assembly 52. The actuator support 64 can be provided with a horizontal through hole to receive a relatively large dowel 85. Additional through holes 86 can be provided to allow any plastic that may leak from the valve pin bushing 102 into the actuator support to flow out of the part without creating a high pressure.

The pin head 62 is used to retain the valve pin 28 and is provided with external threads to hold the pin head to the actuator cap 60. The pin head 62 has a central bore that is threaded to receive the end of the locking screw 66 and can be provided with a transverse slot 87 to receive the large dowel 85. The vertical slot 87 allows the valve pin assembly 70 to move vertically relative to the dowel. The vertical slot 87 and the dowel 85 serve to prevent rotation of the valve pin assembly and maintain angular alignment of the valve pin relative to the gate 32.

The pin head 62 has a central aperture for receiving the top of the valve pin and two horizontal holes for receiving the pair of dowel pins 90. Corresponding slots are provided at the top end of the valve pin 28 for receiving the dowel pins 90. The two dowel pins 90 are used to hold the valve pin 28 with respect to the pin head 62 while preventing rotation of the valve pin. The larger dowel 85 is used to prevent rotation of the valve pin assembly 70. The lock screw 66, when tightened, insures that the pin head 62 does not rotate with respect to the actuator cap 60.

Associated with the hot runner manifold 16 is a bushing nut 100, as illustrated. The bushing nut has external threads as illustrated for engagement into the hot runner manifold 16. The bushing nut serves to retain the valve pin bushing 102 in position without exerting any axial stresses that can cause binding of the valve pin 28. The valve pin bushing 102 provides a guide for the valve pin 28. Using tight tolerances, a plastic seal is created between the valve pin 28 and the valve pin bushing 102. The bottom surface of the valve pin bushing 102 provides a seal between the manifold 16 and the bushing 102 to prevent upstream plastic leakage. The bushing 102 and nut 100 thus provide a mount by which the valve pin is slidably mounted in, on or to the manifold 16.

Assembly and disassembly of the top clamp plate 36, and of the entire injection molding system 5, disassembly of the hydraulic actuator assembly 52 from the hot manifold is accomplished by removing the ring 68 and associated snap ring 69. The cylinder 54 and piston 56 along with the hydraulic fluid lines are essentially retained within the top clamp plate 36, while the valve pin assembly 70 remains with the hot runner manifold 16. With the illustrated system, there is no need to drain the hydraulic fluid for disassembly, and there is no need to remove the valve pin from the hot runner manifold.

With reference to FIG. 1 the valve pin assembly 70 is shown supported in a manner that would allow some limited side-to-side motion in any direction as the hot runner manifold undergoes expansion. This is facilitated by the interaction of the ring 68, actuator cap 60 and the annular flange 110 extending inwardly of the piston 56. When the manifold 16, and valve pin assembly 70 mounted thereto, moves, the flange and piston can move side to side within the clearance 103 that is formed between the actuator cap 60 and the flange 110.

In one exemplary embodiment, there is about a 0.25" clearance radially to axial A between the actuator cap 60 and the piston 56. This clearance allows for relative expansion between the hot runner manifold 16 and the top clamp plate 36 essentially in any direction without putting a significant side load force on the valve pin 28. It is also preferred that the piston 56 includes a plating thereon, such as chrome. This plating adds lubricity and insures slippage between the piston 56 and the actuator cap 60 during heat up or cool down of the manifold.

What is claimed is:

1. An injection molding apparatus comprising an injection machine, a manifold, a mold, a clamp plate, an actuator interconnected to a valve pin and an actuator controller, the actuator comprising an actuator housing having a drive piston disposed within a drive piston bore, the drive piston dividing the drive piston bore into an upstream fluid drive chamber communicating with a source of drive fluid through an upstream drive fluid channel and a downstream fluid drive chamber communicating with the source of drive fluid through a downstream drive fluid channel, the actuator controller comprising a controller housing having a drive fluid receiving channel that receives drive fluid exiting the upstream fluid drive chamber of the actuator, the controller housing including a controller piston adapted to control upstream flow of drive fluid from the upstream fluid drive chamber such that the rate of travel of the drive piston is selectively adjustable to a first rate of travel or velocity over the course of travel of the drive piston from a gate closed position to a predetermined intermediate upstream position of upstream travel and such that the rate of travel of the drive piston over the course of travel of the drive piston beyond the predetermined intermediate upstream position is a second rate of travel or velocity that is higher than the first rate of travel or velocity, wherein the controller piston is reciprocally drivable in a forward and a backward direction through a controller piston bore, the controller housing and the controller piston being adapted to route drive fluid that exits the upstream fluid drive chamber of the actuator to exert a drive fluid force that drives the controller piston upstream through a predetermined path of upstream controller travel in the forward direction through the controller piston bore such that drive fluid is routed through the controller housing to the source at a first rate of flow, the controller housing being further adapted to route drive fluid to the source at a second rate of flow that is higher than the first rate of flow after the controller piston has travelled through the predetermined path of controller travel, and, wherein the controller piston bore is divided by the controller piston into a downstream controller chamber that receives the drive fluid exiting the upstream fluid drive chamber and an upstream controller chamber that routes drive fluid to the source via a restriction channel that has a metering valve that is controllably adjustable to enable a user to selectively vary the first rate of flow.

2. The apparatus of claim 1 wherein the actuator controller includes a travel length adjuster that is actuatable by a user to selectively adjust the length of travel of the drive piston from the gate closed position to the predetermined intermediate upstream position of upstream travel.

3. Apparatus according to claim 1 wherein the actuator controller includes a velocity adjuster that is actuatable by a user to selectively adjust the rate of travel or velocity of the drive piston over the course of travel of the drive piston from the gate closed position to the predetermined intermediate upstream position of upstream travel.

4. Apparatus according to claim 1 wherein the metering valve is disposed in a first fluid path to the source and the controller housing includes a second fluid path through which drive fluid flows at the second rate of flow to the source.

5. Apparatus according to claim 1 wherein the controller housing includes a first drive fluid channel route that routes drive fluid at the first rate of flow to the source and a second channel route that routes drive fluid to the source at the second rate of flow.

6. Apparatus according to claim 1 wherein the controller housing is adapted to route drive fluid downstream to the upstream fluid drive chamber such that the drive piston travels at a single velocity over the course of downstream travel from an upstream-most position to the gate closed position.

7. Apparatus according to claim 1 wherein the actuator controller includes a spring adapted to constantly urge the controller piston downstream in the backward direction toward an injection cycle start position, the spring exerting a spring force on the controller piston that is substantially less than the drive fluid force of the drive fluid exiting the upstream fluid drive chamber such that the drive fluid exiting the upstream fluid drive chamber readily drives the controller piston upstream in the forward direction.

8. Method of driving the drive piston in the apparatus of claim 1 upstream from the gate closed position at multiple upstream velocities over the course of an injection cycle.

9. An injection molding apparatus comprising an injection machine, a manifold, a mold, a clamp plate, an actuator interconnected to a valve pin and an actuator controller,
the actuator comprising an actuator housing having a drive piston disposed within a drive piston bore, the drive piston dividing the drive piston bore into an upstream fluid drive chamber communicating with a source of drive fluid through an upstream drive fluid channel and a downstream fluid drive chamber communicating with the source of drive fluid through a downstream drive fluid channel,
the actuator controller comprising a controller housing containing a controller piston reciprocally drivable in a forward and a backward direction through a controller piston bore divided into a downstream controller chamber and an upstream controller chamber,
the controller housing including a first drive fluid port that routes drive fluid between the upstream fluid drive chamber of the actuator and the downstream controller chamber of the actuator controller and a second drive fluid port interconnected to the source of drive fluid that receives drive fluid from the upstream controller chamber of the actuator controller,
the controller housing being adapted to route drive fluid that exits the upstream fluid drive chamber of the actuator to drive the controller piston under a drive fluid force through a path of controller travel during which drive fluid is routed through the controller housing to the second drive fluid port at a first rate of flow, the controller housing being further adapted to route drive fluid through the controller housing to the second drive fluid port at a second rate of flow that is higher than the first rate of flow after the controller piston has travelled through the path of travel,
wherein the controller piston bore is divided by the controller piston into the downstream controller chamber that receives the drive fluid exiting the upstream fluid drive chamber and an upstream controller chamber that routes drive fluid to the source via a restriction channel that has a metering valve that controllably restricts flow of the drive fluid to the first rate of flow.

10. An apparatus according to claim 9 wherein the controller housing is adapted to enable the rate of travel of the drive piston to be selectively adjustable to a first rate of travel or velocity over the course of travel of the drive piston from the gate closed position to the predetermined intermediate position of upstream travel and to adjust the rate of travel of the drive piston over the course of travel of the drive piston beyond the predetermined intermediate upstream position to a second rate of travel or velocity that is higher than the first rate of travel or velocity.

11. Apparatus according to claim 9 wherein the actuator controller includes a travel length adjuster that is actuatable by a user to selectively adjust the length of travel of the drive piston from the gate closed position to the predetermined intermediate position of upstream travel.

12. Apparatus according to claim 9 wherein the actuator controller includes a velocity adjuster that is actuatable by a user to selectively adjust the rate of travel or velocity of the drive piston over a course of travel of the drive piston from the gate closed position to a predetermined position of upstream travel.

13. Apparatus according to claim 12 wherein the velocity adjuster is controllably adjustable to restrict flow of the drive fluid to a selectable rate of restricted flow.

14. Apparatus according to claim 9 wherein the controller housing includes a diversion channel that interconnects to the downstream controller chamber when the controller piston has travelled through the path of controller travel, the diversion channel being adapted to enable flow of the drive fluid to the source at the second rate of flow.

15. Apparatus according to claim 9 wherein the controller housing includes a first drive fluid channel route that routes drive fluid at the first rate of flow to the source and a second channel route that routes drive fluid at the second rate of flow to the source.

16. Apparatus according to claim 9 wherein the controller housing is adapted to route drive fluid downstream to the upstream fluid drive chamber such that the drive piston travels at a single velocity over the course of downstream travel from an upstream-most position to the gate closed position.

17. Apparatus according to claim 9 wherein the actuator controller includes a spring adapted to constantly urge the controller piston in a downstream in the backward direction toward an injection cycle start position, the spring exerting a spring force on the controller piston that is substantially less than the drive fluid force of the drive fluid exiting the upstream fluid drive chamber such that the drive fluid exiting the upstream fluid drive chamber readily drives the controller piston upstream in the forward direction.

18. Method of driving the drive piston in the apparatus of claim 9 upstream from the gate closed position at multiple upstream velocities over the course of an injection cycle.

19. An injection molding apparatus comprising an injection machine, a manifold, a mold, a clamp plate, an actuator interconnected to a valve pin and an actuator controller,
the actuator comprising an actuator housing having a drive piston disposed within a drive piston bore, the drive piston dividing the drive piston bore into an upstream fluid drive chamber communicating with a source of drive fluid through an upstream drive fluid channel and
a downstream fluid drive chamber communicating with the source of drive fluid through a downstream drive fluid channel,
the actuator controller comprising a controller housing having a drive fluid receiving channel that receives drive fluid exiting the upstream fluid drive chamber of the actuator,
the controller housing including a controller piston adapted to control upstream flow of drive fluid from the upstream fluid drive chamber such that the rate of travel of the drive piston is selectively adjustable to a first rate of travel or velocity over the course of travel of the drive piston from a gate closed position to a predetermined intermediate upstream position of upstream travel and such that the rate of travel of the drive piston over the course of travel of the drive piston beyond the predetermined intermediate upstream position is a second rate of travel or velocity that is higher than the first rate of travel or velocity, wherein the controller housing and the controller piston are adapted to route drive fluid that exits the upstream fluid drive chamber of the actuator to exert a drive fluid force that drives the controller piston upstream through a predetermined path of controller travel such that drive fluid is routed through the controller housing to the source at a first rate of flow, the controller housing being further adapted to route drive fluid to the source at a second rate of flow that is higher than the first rate of flow after the controller piston has travelled through the predetermined path of controller travel.

* * * * *